(12) United States Patent
Sung

(10) Patent No.: US 11,295,159 B2
(45) Date of Patent: Apr. 5, 2022

(54) METHOD OF EXTRACTING FEATURES FROM IMAGE, METHOD OF MATCHING IMAGES USING THE SAME AND METHOD OF PROCESSING IMAGES USING THE SAME

(71) Applicant: SAMSUNG ELECTRONICS CO., LTD., Suwon-si (KR)

(72) Inventor: Chang-Hun Sung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 200 days.

(21) Appl. No.: 16/428,046

(22) Filed: May 31, 2019

(65) Prior Publication Data
US 2020/0125884 A1  Apr. 23, 2020

(30) Foreign Application Priority Data
Oct. 18, 2018  (KR) .................. 10-2018-0124329

(51) Int. Cl.
*G06K 9/46* (2006.01)
*G06K 9/42* (2006.01)

(52) U.S. Cl.
CPC ............ *G06K 9/4609* (2013.01); *G06K 9/42* (2013.01); *G06K 9/4647* (2013.01)

(58) Field of Classification Search
None
See application file for complete search history.

(56) References Cited

U.S. PATENT DOCUMENTS

| | | | |
|---|---|---|---|
| 7,945,576 B2 | 5/2011 | Brown et al. | |
| 8,363,973 B2 | 1/2013 | Liu et al. | |
| 8,712,109 B2 | 4/2014 | Hua et al. | |
| 8,805,067 B2 | 8/2014 | Lee et al. | |
| 9,412,037 B2 | 8/2016 | Balestri et al. | |
| 9,418,429 B2 | 8/2016 | Kim et al. | |
| 9,619,733 B2 | 4/2017 | Kim et al. | |
| 9,858,500 B2 | 1/2018 | Brendel et al. | |
| 9,953,248 B2 | 4/2018 | Cho | |
| 10,909,408 B2 * | 2/2021 | Pope | H04N 9/646 |
| 2007/0146502 A1 * | 6/2007 | Ahn | H04N 5/2351 348/229.1 |
| 2012/0082372 A1 | 4/2012 | Mittal et al. | |
| 2012/0182442 A1 * | 7/2012 | Kirsch | G06K 9/00973 348/222.1 |
| 2013/0273968 A1 * | 10/2013 | Rhoads | H04W 4/50 455/556.1 |
| 2014/0301647 A1 * | 10/2014 | Mase | G06K 9/4671 382/195 |
| 2015/0036938 A1 * | 2/2015 | Kim | G06T 7/74 382/201 |
| 2017/0364768 A1 * | 12/2017 | Pope | G06K 9/4671 |
| 2018/0032837 A1 | 2/2018 | Hiroike et al. | |

FOREIGN PATENT DOCUMENTS

KR  10-1454692 B1  10/2014

* cited by examiner

*Primary Examiner* — Nancy Bitar
(74) *Attorney, Agent, or Firm* — Lee IP Law, PC

(57) ABSTRACT

In a method of extracting features from an image, a plurality of initial key points are estimated based on an input image. A plurality of descriptors are generated based on a down-scaled image that is generated by downscaling the input image. A plurality of feature points are obtained by matching the plurality of initial key points with the plurality of descriptors, respectively.

10 Claims, 16 Drawing Sheets

FIG. 10A

RIMG

| R11 | G12 | R13 | G14 | R15 | G16 | ... |
|-----|-----|-----|-----|-----|-----|-----|
| G21 | B22 | G23 | B24 | G25 | B26 | ... |
| R31 | G32 | R33 | G34 | R35 | G36 | ... |
| G41 | B42 | G43 | B44 | G45 | B46 | ... |
| :   | :   | :   | :   | :   | :   |     |

FIG. 10B

GIMG

| P11 | P12 | P13 | P14 | P15 | P16 | ... |
|-----|-----|-----|-----|-----|-----|-----|
| P21 | P22 | P23 | P24 | P25 | P26 | ... |
| P31 | P32 | P33 | P34 | P35 | P36 | ... |
| P41 | P42 | P43 | P44 | P45 | P46 | ... |
| :   | :   | :   | :   | :   | :   |     |

METHOD OF EXTRACTING FEATURES FROM IMAGE, METHOD OF MATCHING IMAGES USING THE SAME AND METHOD OF PROCESSING IMAGES USING THE SAME

CROSS-REFERENCE TO RELATED APPLICATION

Korean Patent Application No. 10-2018-0124329, filed on Oct. 18, 2018 in the Korean Intellectual Property Office (KIPO), and entitled: "Method of Extracting Features from Image, Method of Matching Images Using the Same and Method of Processing Images Using the Same," is incorporated by reference herein in its entirety.

BACKGROUND

1. Field

Example embodiments relate to image processing technologies, and more particularly to methods of extracting features from images, methods of matching images using the extracting methods, and methods of processing images using the matching methods.

2. Description of the Related Art

Computer vision technology is related to artificial intelligence technology to realize a visual recognition ability among five human senses with various electronic devices. An image matching technique in the computer vision technology has been an important technique area as the image matching technique can be applied to various applications, e.g., an intelligent robot, an augmented reality, a virtual reality, a three-dimensional structure formation, a security technology based on face recognition, or the like. As mobile communication devices, e.g., smart phones and tablet PCs. have been dramatically developed in mobile communication technology, demand for a real-time image matching technique has been continuously demanded in a mobile environment. However, when images are captured in a mobile environment, various influential factors, e.g., size, lighting, obstacles, and rotation, or the like, may influence the captured images. Further, when the captured images have a large motion or movement or when the captured images are captured in a dark environment, it may be difficult to precisely recognize features in the captured image.

SUMMARY

Embodiments are directed to a method of extracting features from an image. The method may include: estimating a plurality of initial key points based on an input image; generating a plurality of descriptors based on a downscaled image that is generated by downscaling the input image; and obtaining a plurality of feature points by matching the plurality of initial key points with the plurality of descriptors, respectively.

Embodiments are directed to a method of matching images. The method may include: detecting a plurality of first feature points based on a first input image; detecting a plurality of second feature points based on a second input image; and obtaining a plurality of correspondence points between the first input image and the second input image based on the plurality of first feature points and the plurality of second feature points. The detection of the plurality of first feature points includes: estimating a plurality of first initial key points based on the first input image; generating a plurality of first descriptors based on a first downscaled image that is generated by downscaling the first input image; and obtaining the plurality of first feature points by matching the plurality of first initial key points with the plurality of first descriptors, respectively.

Embodiments are directed to a method of processing images. The method may include: setting a plurality of correspondence points between a first input image and a second input image; and performing an image processing on at least one of the first input image and the second input image based on the plurality of correspondence points. The setting of the plurality of correspondence points includes: detecting a plurality of first feature points based on the first input image; detecting a plurality of second feature points based on the second input image; and obtaining the plurality of correspondence points based on the plurality of first feature points and the plurality of second feature points. The detection of the plurality of first feature points includes: estimating a plurality of first initial key points based on the first input image; generating a plurality of first descriptors based on a first downscaled image that is generated by downscaling the first input image; and obtaining the plurality of first feature points by matching the plurality of first initial key points with the plurality of first descriptors, respectively.

BRIEF DESCRIPTION OF THE DRAWINGS

Features will become apparent to those of skill in the art by describing in detail exemplary embodiments with reference to the attached drawings in which:

FIGS. 10A and 10B illustrate an operation of converting the input image into the 1-channel image in FIG. 8.

DETAILED DESCRIPTION

Hereafter, example embodiments will be explained in detail with reference to the accompanying drawings.

Figure 1:
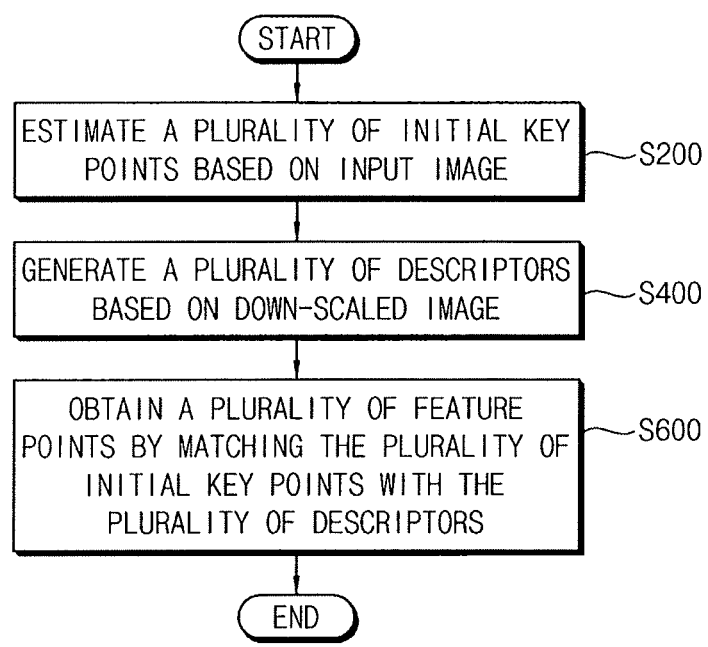
FIG. 1 illustrates a method of extracting features from an image according to example embodiments.

FIG. 1 illustrates a method of extracting features from an image according to example embodiments. Referring to FIG. 1, a plurality of initial key points may be estimated based on an input image (step S200). A key point may represent a point associated with a feature or characteristic of the input image, and may be referred to as an interest point. For example, the key point may be located at an outline of an object in the input image. The plurality of initial key points may be estimated from the input image based on at least one of various algorithms for image analysis, as will be described later.

In some example embodiments, the input image may be an 1-channel image.

The 1-channel image may not include color information and may include only luminance information. The 1-channel image may be referred to as a gray image, a grayscale image, or a monochrome image. When the input image is not the 1-channel image, the input image may be converted into the 1-channel image by a converting image process, as will be described with reference to FIG. 6.

A plurality of descriptors may be generated based on a downscaled image that is generated by downscaling the input image (step S400). Each descriptor may represent a feature or characteristic of a respective key point. The plurality of descriptors may also be generated using at least one of various algorithms for image analysis, as will be described later.

For example, when the input image is converted into the downscaled image, an intensity difference between adjacent pixels may be increased. In other words, an intensity difference of adjacent pixels in the downscaled image may be greater than that in the input image. Thus, when the plurality of descriptors are generated based on the downscaled image, each descriptor may be robust against noise and have improved singularity.

A plurality of feature points are obtained by matching the plurality of initial key points with the plurality of descriptors, respectively (step S600). For example, one initial key point and one descriptor may be matched with each other to obtain one feature point. A plurality of correspondence points between two images may be obtained using the plurality of feature points, as will be described with reference to FIG. 13.

Figure 2:
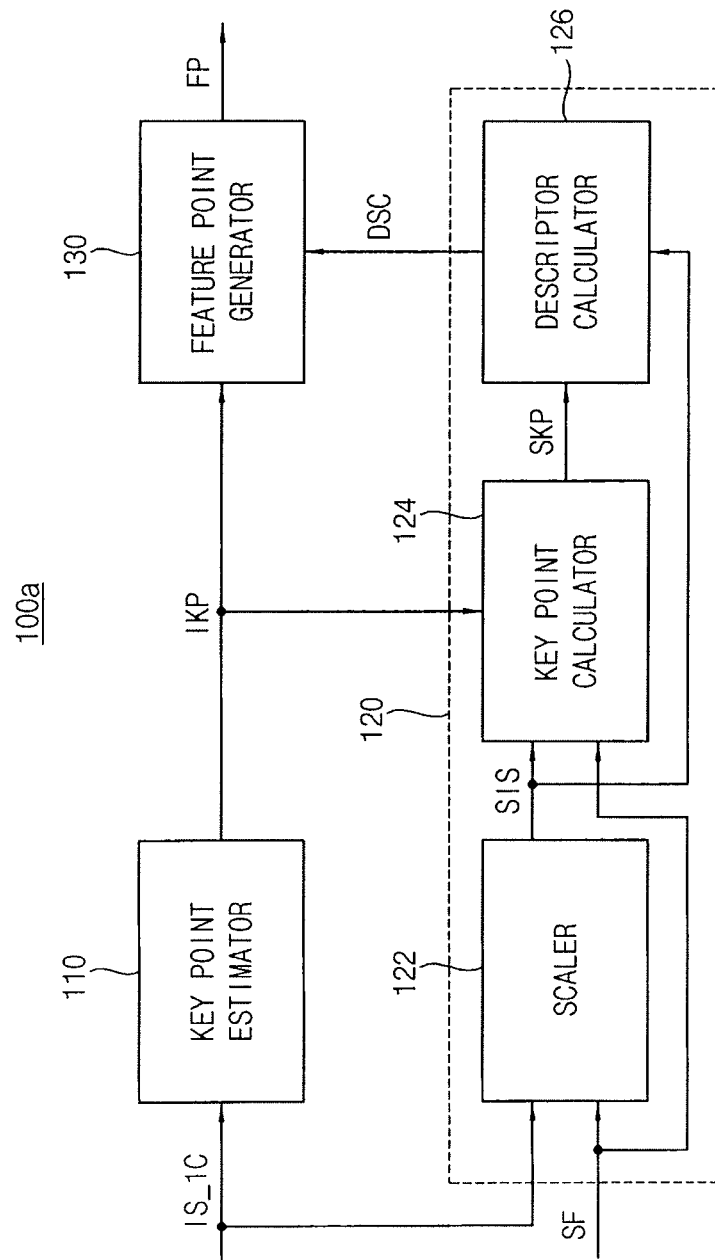
FIG. 2 illustrates a feature extracting device according to example embodiments.

FIG. 2 illustrates a feature extracting device according to example embodiments. Referring to FIG. 2, a feature extracting device 100a may include a key point estimator 110, a descriptor generator 120, and a feature point generator 130.

The key point estimator 110 may receive an 1-channel image signal IS_1C as an input image, estimate a plurality of initial key points based on the 1-channel image signal IS_1C, and output an initial key point signal IKP indicating the plurality of initial key points. In other words, the key point estimator 110 may perform or execute step S200 in FIG. 1. The input image may be an 1-channel image, e.g., a gray image, a grayscale image, or a monochrome image.

Figure 19:
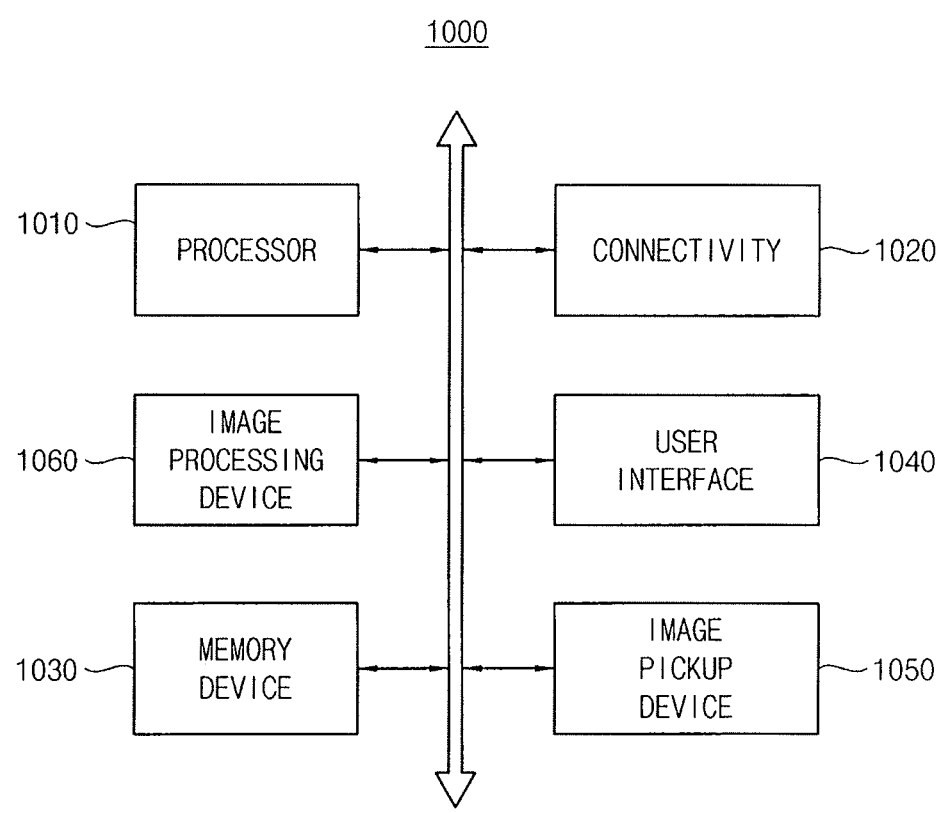
FIG. 19 illustrates an electronic system according to example embodiments.

In some example embodiments, the 1-channel image signal IS_1C may be provided from an external image pickup device (e.g., an image pickup device 1050 in FIG. 19) and/or an external memory device (e.g., a memory device 1030 in FIG. 19). In other example embodiments, the 1-channel image signal IS_1C may be provided from a separate image converter (e.g., an image converter 140 in FIG. 7).

The descriptor generator 120 may perform or execute step S400 in FIG. 1. For example, the descriptor generator 120 may receive the 1-channel image signal IS_1C, the initial key point signal IKP and a scaling factor SF, may generate a plurality of descriptors based on a downscaled image that is generated by downscaling the 1-channel image signal IS_1C, and may output a descriptor signal DSC indicating the plurality of descriptors.

For example, the descriptor generator 120 may include a scaler 122, a key point calculator 124, and a descriptor calculator 126. The scaler 122 may receive the 1-channel image signal IS_1C and the scaling factor SF, may generate the downscaled image by downscaling the 1-channel image signal IS_1C, and may output a downscaled image signal SIS indicating the downscaled image. The scaling factor SF may be provided from a controller that is located inside or outside the feature extracting device 100a.

The key point calculator 124 may receive the downscaled image signal SIS, the scaling factor SF, and the initial key point signal IKP, may calculate a plurality of downscaled key points that are included in the downscaled image signal SIS and correspond to the plurality of initial key points, and may output a downscaled key point signal SKP indicating the plurality of downscaled key points.

The descriptor calculator 126 may receive the initial key point signal IKP and the downscaled key point signal SKP, may calculate the plurality of descriptors, and may output the descriptor signal DSC.

The feature point generator 130 may perform or execute step S600 in FIG. 1. For example, the feature point generator 130 may receive the initial key point signal IKP and the descriptor signal DSC, may obtain a plurality of feature points by matching the plurality of initial key point signal IKP with the descriptor signal DSC, respectively, and outputs a feature point signal FP indicating the plurality of feature points.

In some example embodiments, at least a part of the key point estimator 110, the descriptor generator 120 and the feature point generator 130 may be implemented in hardware. For example, at least a part of the elements included in the feature extracting device 100a according to example embodiments may be included in a computer-based electronic system. In another embodiment, all of the key point estimator 110, the descriptor generator 120 and the feature point generator 130 may be implemented in hardware. In other example embodiments, at least a part of the key point estimator 110, the descriptor generator 120, and the feature point generator 130 may be implemented in software, e.g. instruction codes or program routines. For example, the instruction codes or the program routines may be executed by a computer-based electronic system, and may be stored in any storage device located inside or outside the computer-based electronic system. In another embodiment, all of the key point estimator 110, the descriptor generator 120 and the feature point generator 130 may be implemented in software.

Figure 3:
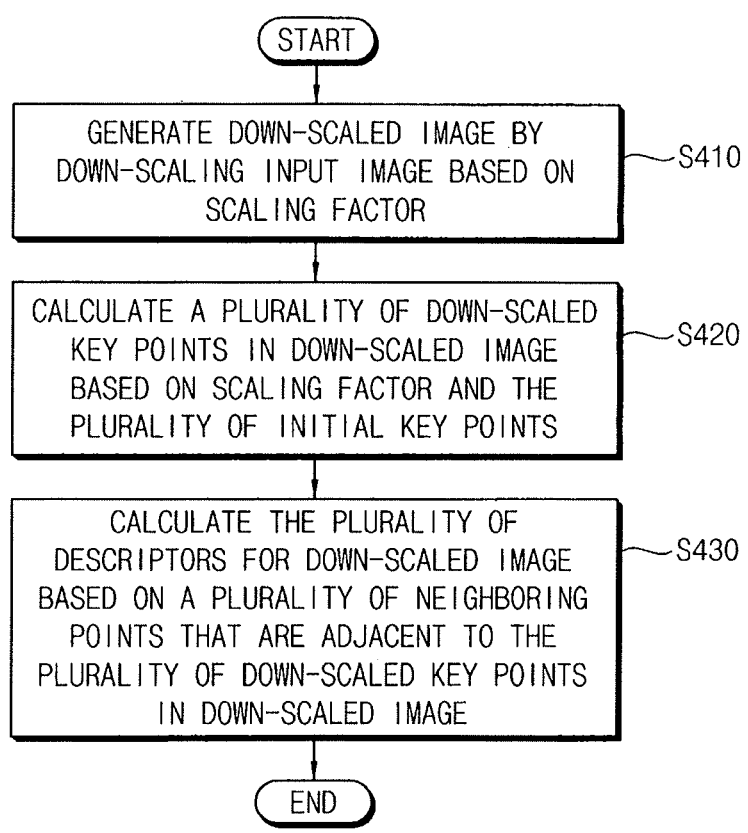
FIG. 3 illustrates steps in generating a plurality of descriptors in FIG. 1.

FIG. 3 illustrates an example of generating a plurality of descriptors in FIG. 1. FIGS. 4A, 4B, 5A and 5B illustrate an operation of generating the plurality of descriptors in FIG. 3. Referring to FIGS. 1, 3, 4A and 4B, before generating the plurality of descriptors, a plurality of initial key points IKP11, IKP12 and IKP13 may be estimated based on an input image IMG1 (step S200).

Figure 4A:
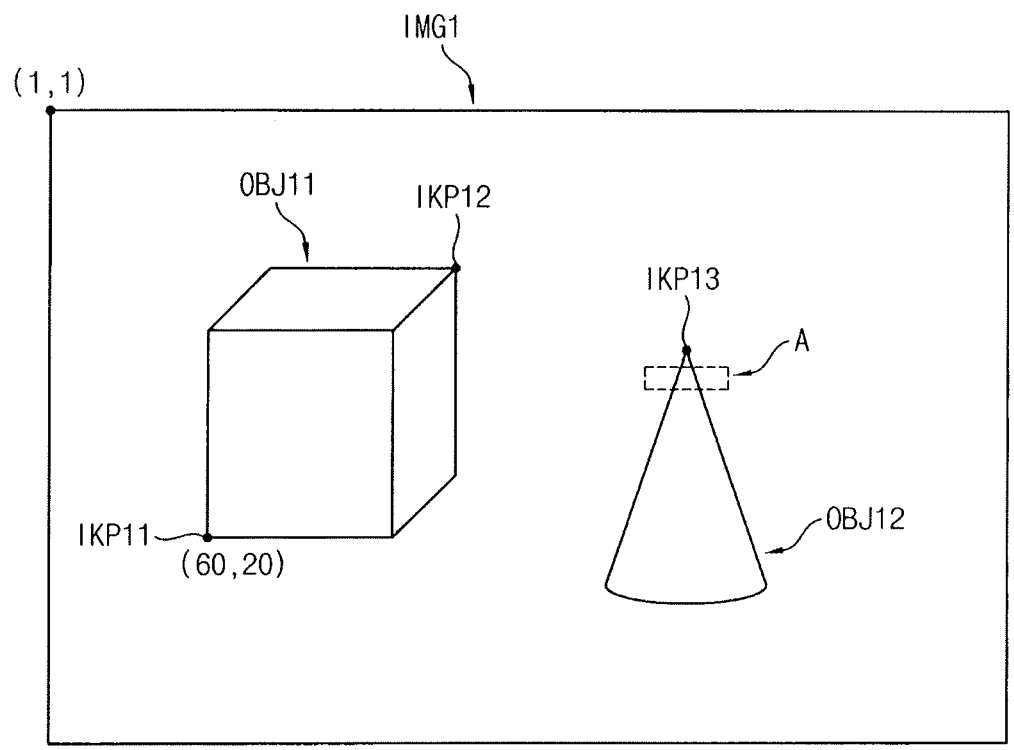
FIGS. 4A, 4B, 5A and 5B illustrate operations in generating the plurality of descriptors in FIG. 3.

As illustrated in FIG. 4A, an input image IMG1 may include two objects OBJ11 and OBJ12. For example, two corner points of the object OBJ11 and one corner point of the object OBJ12 may be estimated (or be referred to) as the plurality of initial key points IKP11, IKP12 and IKP13. Such manner of estimating corner points as key points may be referred to as a corner detection or a corner detection scheme.

A corner point of an object in an image may be defined as an intersection of at least two edges of the object in the image. Further, the corner point of the object in the image may also be defined as a point at which there are at least two dominant and different edges in a local neighborhood of the point. A key point or an interest point in the image may be a point that has a well-defined position to be robustly detected (i.e., to be well detected against a noise background). For example, the corner point of the object in the image may be used as the key point or the interest point in the image. Further, vertexes of the object in the image may be used as key points or interest points in the image.

In some example embodiments, corner points in an image may be detected based on at least one of various algorithms, e.g., FAST (Features from Accelerated Segment Test), Harris, or the like. The detected corner points may be estimated as the initial key points IKP11, IKP12 and IKP13.

In other example embodiments, blob points or blob regions in the input image IMG1 (not illustrated in FIG. 4A) may be estimated as a plurality of initial key points. Such manner of estimating blob points as key points may be referred to as a blob detection or a blob detection scheme.

The blob detection or the blob detection scheme may be related to detecting regions in a digital image that differs in properties, e.g., brightness or color, compared to surrounding regions. For example, a blob may be a region of an image in which some properties are constant or approximately constant. All the points in the blob may be similar to each other. For example, the blob may be used as a key point. A blob region may be referred to as a region of interest (ROI).

In some example embodiments, blobs may be detected based on at least one of various algorithms, e.g., MSER (Maximally Stable Extremal Regions), or the like. The detected blobs may be estimated as the initial key points.

As described above, the plurality of initial key points may be estimated based on at least one of a corner detection and a blob detection. For example, the plurality of initial key points may be estimated based on at least one of other detection schemes. e.g., a ridge detection, an edge detection, or the like.

Hereinafter, example embodiments will be described based on a case where corners of an object in an image are estimated as the plurality of initial key points IKP11, IKP12 and IKP13.

As described above, the plurality of descriptors are generated based on the downscaled image SIMG1 in step S400. The downscaled image SIMG1 may be generated by downscaling the input image IMG1 based on a scaling factor in step S410. For example, step S410 may be performed by the scaler 122 in FIG. 2.

Figure 4B:
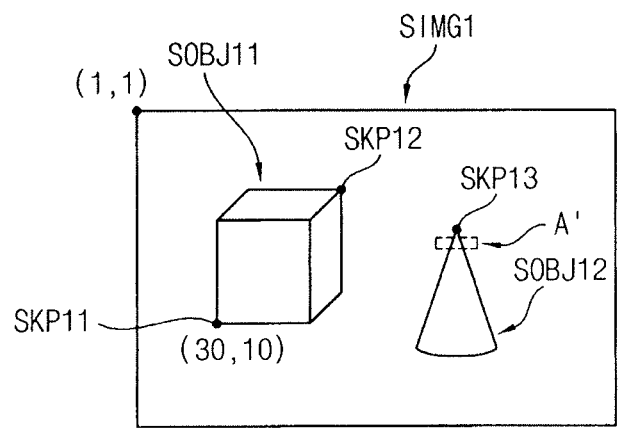

As illustrated in FIG. 4B, the downscaled image SIMG1 may be an image that is generated by downscaling the input image IMG1 by about a half (i.e., about ½). The scaling factor for downscaling the input image IMG1 may be about 2. Objects SOBJ11 and SOBJ12 in the downscaled image SIMG1 may be downscaled from the objects OBJ11 and OBJ12 in the input image IMG1. For example, sizes of edges of the objects SOBJ11 and SOBJ12 in the downscaled image SIMG1 may be half (i.e., ½) than those of corresponding edges of the objects OBJ11 and OBJ12 in the input image IMG1.

The plurality of downscaled key points SKP11, SKP12 and SKP13 in the downscaled image SIMG1 may be calculated based on the scaling factor and the plurality of initial key points IKP11, IKP12 and IKP13 (step S420). For example, the plurality of downscaled key points SKP11, SKP12 and SKP13 in the downscaled image SIMG1 may be calculated by applying the scaling factor to the plurality of initial key points IKP11, IKP12 and IKP13. The plurality of downscaled key points SKP11, SKP12 and SKP13 in the downscale image SIMG1 may correspond to the plurality of initial key points IKP11, IKP12 and IKP13 in the input image IMG, respectively. Step S420 may be performed by the key point calculator 124 in FIG. 2.

In some example embodiments, when pixel positions of n initial key points in the input image IMG1 are $x_i=\{x_i, y_i\}$, $i=1, 2, \ldots, n$, where n is a natural number greater than or equal to two, pixel positions $\hat{x}_i=\{\hat{x}_i,\hat{y}_i\}$, $i=1, 2, \ldots, n$ of n downscaled key points in the downscaled image SIMG1 may be obtained by Equation 1.

$$\hat{x}_i = \frac{x_i}{\Delta s}, \hat{y}_i = \frac{y_i}{\Delta s} \qquad \text{[Equation 1]}$$

In Equation 1, $\Delta s$ may correspond to the scaling factor.

For example, an upper left pixel position in the input image IMG1 may be (1,1), and an upper left pixel position in the downscaled image SIMG1 may be (1,1). In this case, when the scaling factor is about 2, a pixel position of the initial key point IKP11 in the input image IMG1 is (60,20), and a pixel position of the downscaled key point SKP11 in the downscaled image SIMG1 may be (30,10) by Equation 1.

As described above, when the pixel positions of the downscaled key points in the downscaled image are calculated by applying the scaling factor to the pixel positions of the initial key points in the input image, a loss of positional information of the initial key points in the input image may be prevented because the pixel positions of the initial key points are estimated from the input image (e.g., an original image), and thus an positional accuracy of the downscaled key points may be maintained because the pixel positions of the downscaled key points are calculated based on the lossless position information of the initial key points.

The plurality of descriptors for the downscaled image SIMG1 may be calculated based on a plurality of neighboring points that are adjacent to the plurality of downscaled key points SKP11, SKP12 and SKP13 in the downscaled image SIMG1 (step S430). The plurality of neighboring points may represent pixels that are adjacent to the pixel positions of the plurality of downscaled key points SKP11, SKP12 and SKP13. Step S430 may be performed by the descriptor calculator 126 in FIG. 2.

In some example embodiments, the plurality of descriptors may be generated using at least one of various algorithms, e.g., ORB (Oriented Features from Accelerated Segment Test (FAST) and Rotated Binary Robust Independent Elementary Features (BRIEF)), SIFT (Scale-Invariant Feature Transform), SURF (Speeded Up Robust Features), MSD (Maximal Self-Dissimilarities), or the like.

The SIFT may be a feature detection algorithm for extracting features in an image. The extracted feature points generated by the SIFT may be applied to an image processing system, e.g., a surveillance camera or an autonomous navigation system. The image processing system may recognize objects in the image by deriving a high-order descriptor from the extracted feature points of the objects.

Further, the SURF may be is another method for extracting features in an image, the extracted feature points generated by the SURF may be applied to an image processing system, e.g., an object tracking system or a panoramic image generating system. The image processing system may recognize objects in an image by deriving feature points and a high-order descriptor according to each scale of an integral image that is generated by summing or accumulating pixel values of an input image. While the SIFT and the SURF have advantages that they are robust to image (or object) size, illumination variations, and image variations due to rotations, they have disadvantages that complex computations are required because the generated descriptor is a real value or floating vector.

The ORB may be an oriented FAST and rotated BRIEF algorithm. For example, when objects in an image is recognized using the ORB, feature points of objects in the image may be extracted by the oriented FAST or rotated BRIEF algorithm, a binary descriptor may be generated based on the extracted feature points generated by the oriented FAST or rotated BRIEF algorithm. As the generated binary descriptor is a binary vector, an amount of computations may be decreased, and an object recognition speed may be increased.

Based on the algorithm described above, n descriptors $\hat{D}_i=\{\hat{x}_i\}, i=1, 2, 3, \ldots, n$ may be generated for n downscaled key points $\hat{x}_i=\{\hat{x}_i, \hat{y}_i\}$ in the downscaled image SIMG1.

As described above, a plurality of descriptors may be generated based on at least one of the ORB, the SIFT, the SURF and the MSD. For example, the plurality of descriptors may be generated based on at least one of other algorithms, e.g., BRIEF, BRISK (Binary Robust Invariant Scalable Key point), FREAK(Fast Retina Key point), or the like.

After generating the plurality of descriptors, the plurality of feature points are obtained by matching the plurality of initial key points IKP11, IKP12 and IKP13 in the input image IMG1 with the plurality of descriptors, respectively (step S600).

For example, the initial key point IKP11 may be matched with the descriptor for the downscaled key point SKP11 to obtain one feature point. Similarly, the n initial key points $x_i=\{x_i, y_i\}$, $i=1, 2, \ldots, n$ may be matched with the n descriptors $\hat{D}_i=\{\hat{x}_i\}$, $i=1, 2, 3, \ldots, n$, respectively, to obtain n feature points $f_i=\{x_i, \hat{D}_i\}$.

Figure 5A:
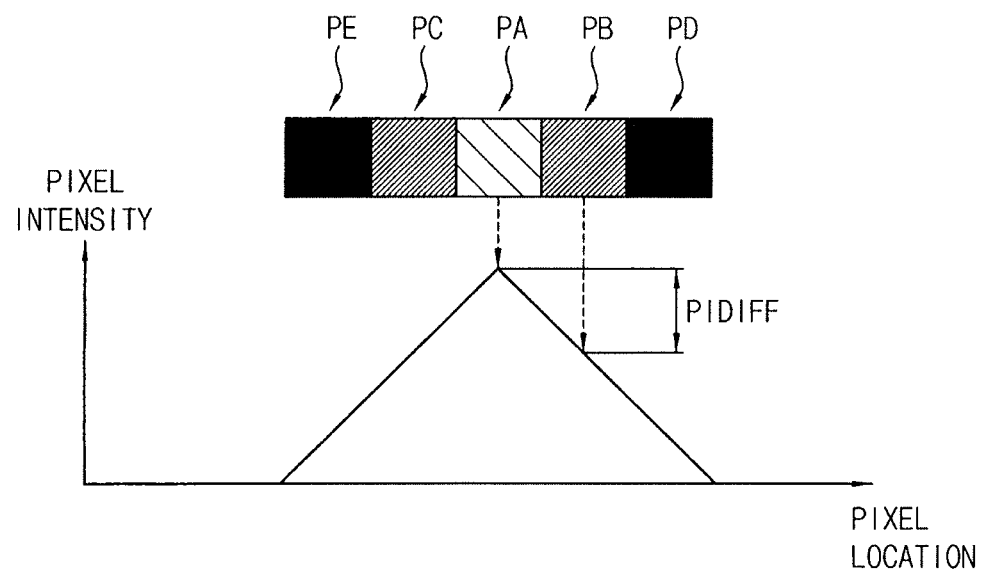
Figure 5B:
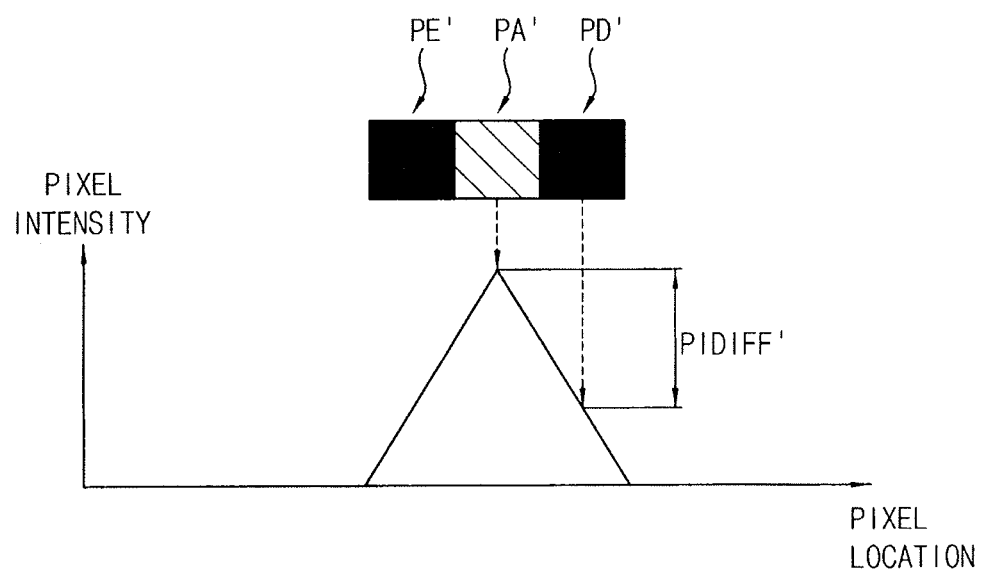

Referring to FIGS. 5A and 5B, FIG. 5A illustrates an enlarged view of an area A in FIG. 4A. FIG. 5B illustrates an enlarged view of an area A' in FIG. 4B.

For example, in FIG. 5A, a pixel PA may have light gray (e.g., high gray level), pixels PB and PC adjacent to the pixel PA may have dark gray (e.g., low gray level), and pixels PD and PE adjacent to the pixels PB and PC may have black (e.g., zero gray level). For example, in FIG. 5B, as an image is downscaled by a scale factor of about a half, a pixel PA' (corresponding to the pixel PA in FIG. 5A) may have relatively light gray, pixels corresponding to the pixels PB and PC in FIG. 5A may be omitted or deleted, and pixels PD' and PE' (corresponding to the pixels PD and PE in FIG. 5A) may have black.

For example, an intensity difference PIDIFF' between adjacent pixels PA' and PD' in the downscaled image SIMG1 in FIG. 5B may be greater than an intensity difference PIDIFF between adjacent pixels PA and PB in the input image IMG1 in FIG. 5A. In other words, as an image is downscaled, an intensity difference between adjacent pixels may be increased As described above, the plurality of initial key points IKP11, IKP12, and IKP13 may be estimated from the input image IMG1 such that the positional accuracy of the plurality of initial key points may be maintained. Further, when the plurality of descriptors may be generated from the downscaled image SIMG1, in which the intensity difference PIDIFF' between the adjacent pixels PA' and PD' is relatively large, the plurality of descriptors may be robust against noise, and may have improved singularity. For example, when a low illuminance image captured in a dark environment, e.g., a night-time photograph, and/or a blur image captured at a large motion of an object are downscaled, an intensity difference (or a brightness difference) between adjacent pixels in the low illuminance image or the blur image may increase. Thus, descriptors obtained in a downscaled image may have improved specificity or singularity than descriptors obtained in an original image.

Figure 6:
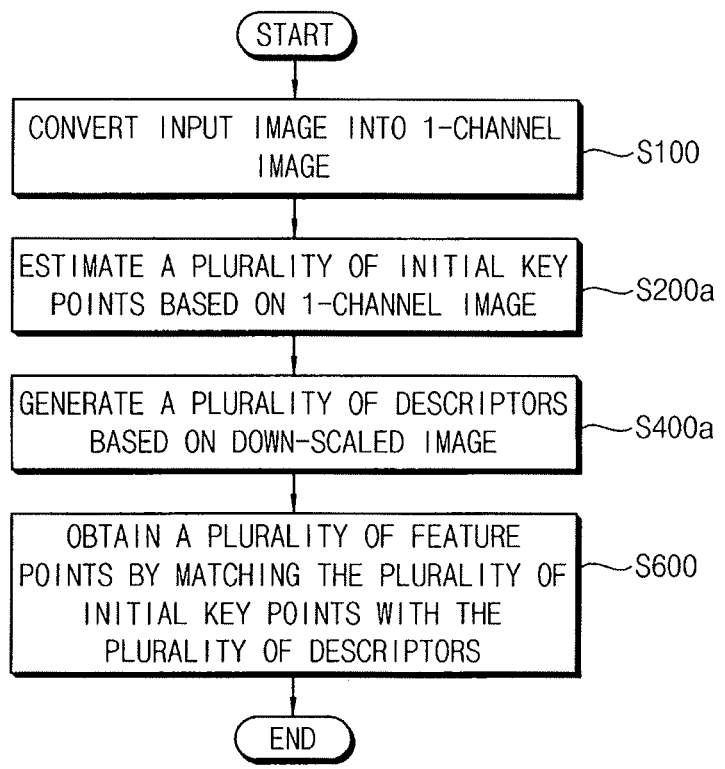
FIG. 6 illustrates a method of extracting features from an image according to example embodiments.

FIG. 6 illustrates a method of extracting features from an image according to example embodiments. Referring to FIG. 6, an input image may be converted into an 1-channel image when the input image is not the 1-channel image (step S100).

In some example embodiments, the input image may be a 3-channel image (e.g., an RGB image) having a Bayer pattern. It may be difficult to extract feature points from a raw image having pixel data of a Bayer pattern. Thus, the raw image may be converted into an 1-channel image that is used for extracting features.

For example, a plurality of initial key points may be estimated based on the 1-channel image (step S200a), and a plurality of descriptors may be generated based on a downscaled image that is generated by downscaling the 1-channel image (step S400a). Steps S200a and S400a in FIG. 6 may be substantially the same as steps S200 and S400 in FIG. 1, respectively, except that steps S200a and S400a are performed based on the 1-channel image.

For example, a plurality of feature points may be obtained by matching the plurality of initial key points with the plurality of descriptors, respectively (step S600). Step S600 in FIG. 6 may be substantially the same as step S600 in FIG. 1.

Figure 7:
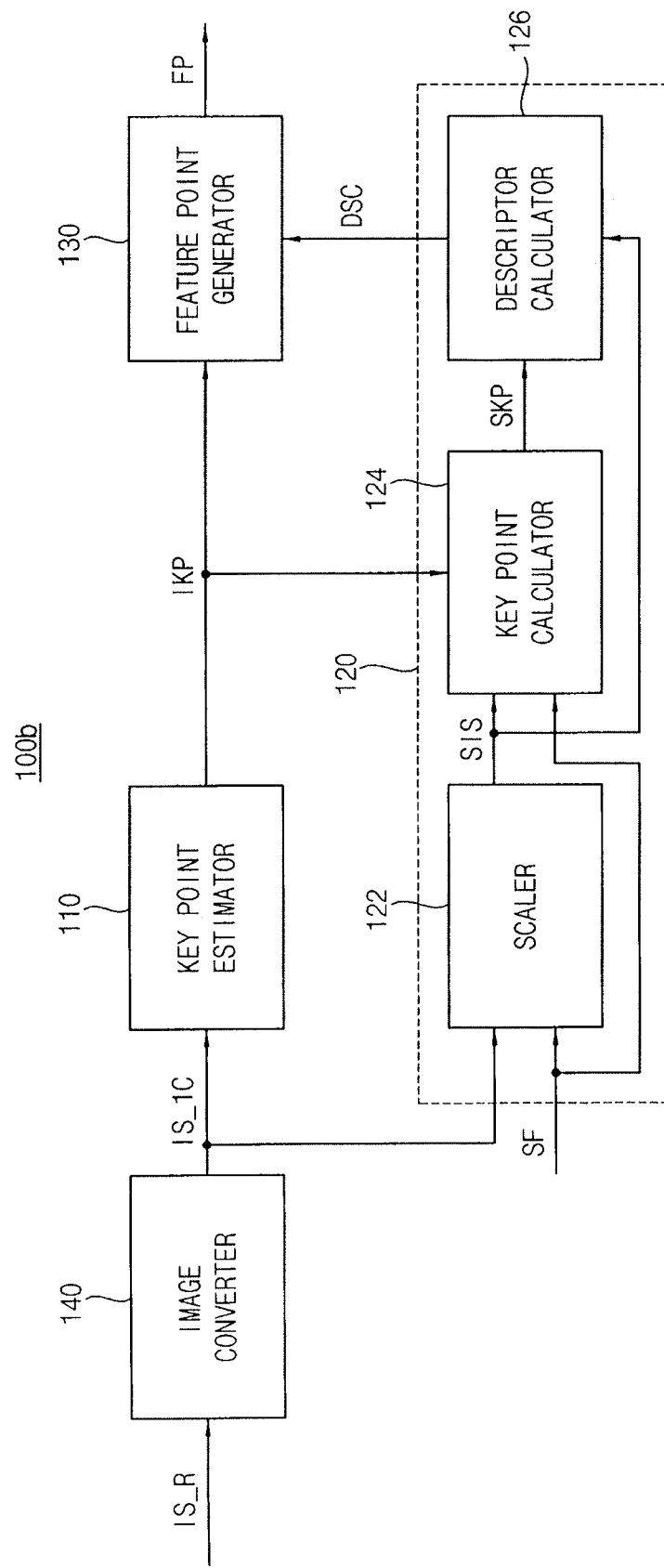
FIG. 7 illustrates a feature extracting device according to example embodiments.

FIG. 7 illustrates a feature extracting device according to example embodiments.

Referring to FIG. 7, a feature extracting device 100b may include a key point estimator 110, a descriptor generator 120, a feature point generator 130, and an image converter 140.

The feature extracting device 100b in FIG. 7 may be substantially the same as the feature extracting device 100a in FIG. 2, except that the feature extracting device 100b further includes the image converter 140.

The image converter 140 may receive a raw image signal IS_R indicating an input image, may convert the input image into an 1-channel image, and may output an 1-channel image signal IS_1C indicating the 1-channel image. The input image may be a raw image that has not been processed. In other words, the image converter 140 may perform or execute step S100 in FIG. 6.

In some example embodiments, the raw image signal IS_R may be provided from an external image pickup device (e.g., an image pickup device 1050 in FIG. 19) and/or an external memory device (e.g., a memory device 1030 in FIG. 19).

In some example embodiments, at least a part of the image converter 140 may be implemented in hardware. In other example embodiments, at least a part of the image converter 140 may be implemented in software, e.g., instruction codes or program routines.

Figure 8:
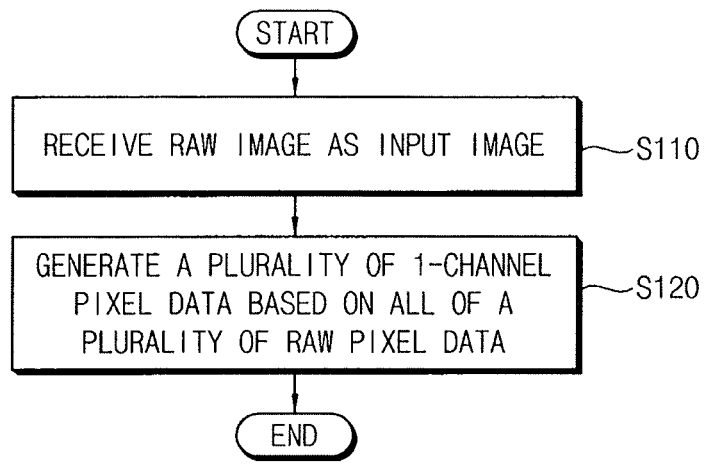
FIG. 8 illustrates an example of converting an input image into an 1-channel image in FIG. 6.
Figure 9:
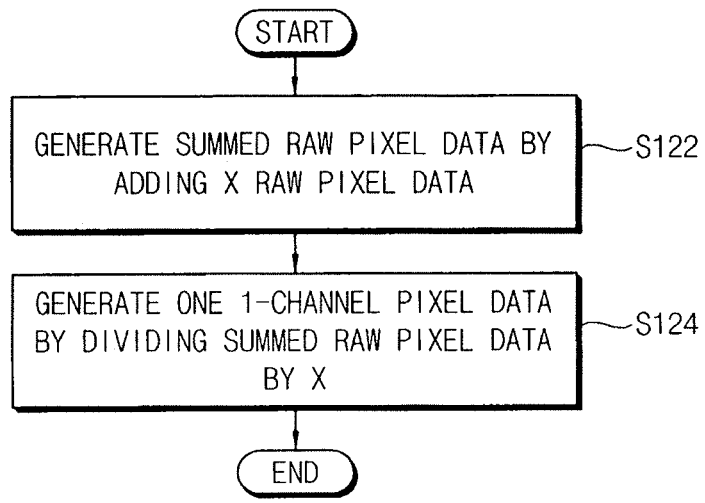
FIG. 9 illustrates an example of generating a plurality of 1-channel pixel data in FIG. 8.

FIG. 8 illustrates an example of converting an input image into an 1-channel image in FIG. 6. FIG. 9 illustrates an example of generating a plurality of 1-channel pixel data in FIG. 8. FIGS. 10A and 10B illustrate examples for describing an operation of converting the input image into the 1-channel image in FIG. 8.

Referring to FIGS. 6, 8, 9, 10A and 10B, the input image is converted into the 1-channel image (step S100 in FIG. 6). A raw image RIMG, which has not been processed, may be received as the input image (step S110 in FIG. 8).

As illustrated in FIG. 10A, the raw image RIMG may be a 3-channel image having a Bayer pattern. For example, the raw image RIMG may include a plurality of color pixel data obtained from a plurality of color pixels. Red pixel data R11, R13, R15, . . . , R31, R33, R35, . . . , green pixel data G12, G14, G16, . . . , G21, G23, G25, . . . , G32, G34, G36, . . . , G41, G43, G45, . . . , and blue pixel data B22, B24, B26, . . . , B42, B44, B46, . . . , may be included in the plurality of color pixel data. In the raw image RIMG, one red pixel data (e.g., R11), two green pixel data (e.g., G12 and G21), and one blue pixel data (e.g., B22) may be arranged in a 2*2 matrix form to constitute one pixel data group. For example, the raw image RIMG may include an image pattern formed by repeatedly arranging a RGGB color pattern corresponding one pixel data group along a first direction D1 and a second direction D2 crossing (e.g., perpendicular to) the first direction D1.

For example, referring to FIG. 10B, a plurality of 1-channel pixel data P11, P12, P13, P14, P15, P16, . . . , P21, P22, P23, P24, P25, P26, . . . , P31, P32, P33, P34, P35, P36, . . . , P41, P42, P43, P44, P45, P46, . . . included in an 1-channel image GIMG may be generated based on all of a plurality of raw pixel data R11, G12, R13, G14, R15, G16, . . . , G21, B22, G23, B24, G25, B26, . . . , R31, G32, R33, G34, R35, G36, . . . , G41, B42, G43, B44, G45, B46, . . . included in the raw image RIMG (step S120). The plurality of raw pixel data may represent pixel values (e.g., grayscales) of a color image obtained from the plurality of color pixels, and the plurality of 1-channel pixel data may represent pixel values of a gray image.

In some example embodiments, the raw image RIMG and the 1-channel image GIMG may have substantially the same size. In other words, the number of the plurality of raw pixel data (or the number of the plurality of color pixels) in the raw image RIMG may be substantially the same as the number of the plurality of 1-channel pixel data (or the number of a plurality of pixels or gray pixels) in the 1-channel image GIMG.

For example, when the plurality of 1-channel pixel data are generated (step S120), one 1-channel pixel data (e.g., a first 1-channel pixel data) among the plurality of 1-channel pixel data may be generated based on X raw pixel data among the plurality of raw pixel data, where X is a natural number greater than or equal to two. The X raw pixel data may be obtained from X pixels that are adjacent to each other. For example, a summed raw pixel data may be generated by adding the X raw pixel data (step S122). The one 1-channel pixel data may be generated by dividing the summed raw pixel data by X (step S124).

In some example embodiments, the X raw pixel data may be obtained from four pixels that are arranged in a 2*2 matrix form. Pixel data of the four pixels may be one pixel data group. In other words, X is 4, and each of the plurality of 1-channel pixel data may be generated by the one pixel data group because the RGGB color pattern including one red pixel data, two green pixel data and one blue pixel data arranged in a 2*2 matrix form is repeated in the raw image RIMG.

For example, the 1-channel pixel data P11 in the 1-channel image GIMG may be calculated using the raw pixel data R11 at a corresponding position in the raw image RIMG and the raw pixel data G12, G21 and B22 adjacent to the raw pixel data R11. For example, a value of the 1-channel pixel data P11 may be obtained by an equation: P11=(R11+G12+G21+B22)/4.

Similarly, the 1-channel pixel data P12 in the 1-channel image GIMG may be calculated using the raw pixel data G12, R13, B22 and G23 arranged in a 2*2 matrix form in the raw image RIMG, the 1-channel pixel data P21 in the 1-channel image GIMG may be calculated using the raw pixel data G21, B22, R31 and G32 arranged in a 2*2 matrix form in the raw image RIMG, and the remainder of 1-channel pixel data in the 1-channel image GIMG may be calculated in a similar way.

In some example embodiments, 1-channel pixel data arranged in a last row and a last column in the 1-channel image GIMG may not have corresponding pixel data group arranged in a 2*2 matrix form in the raw image RIMG. Thus, the 1-channel pixel data arranged in the last row and the last column in the 1-channel image GIMG may be calculated using one raw pixel data at a corresponding position in the raw image RIMG or using one raw pixel data at a corresponding position in the raw image RIMG and another one raw pixel data adjacent to the one raw pixel data. For example, 1-channel pixel data arranged in a first row and a last column in the 1-channel image GIMG may be substantially equal to raw pixel data arranged in a first row and a last column in the raw image RIMG or may be calculated by adding two raw pixel data arranged in first and second rows and the last column in the raw image RIMG and by dividing the added raw pixel data by two.

Figure 11:
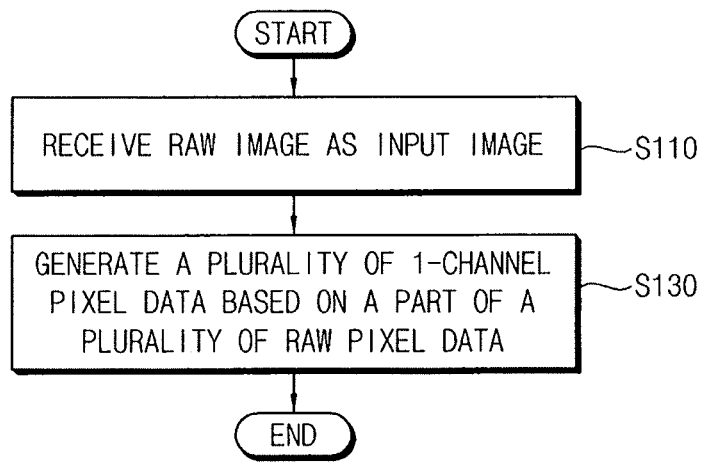
FIG. 11 illustrates another example of converting an input image into an 1-channel image in FIG. 6.
Figure 12:
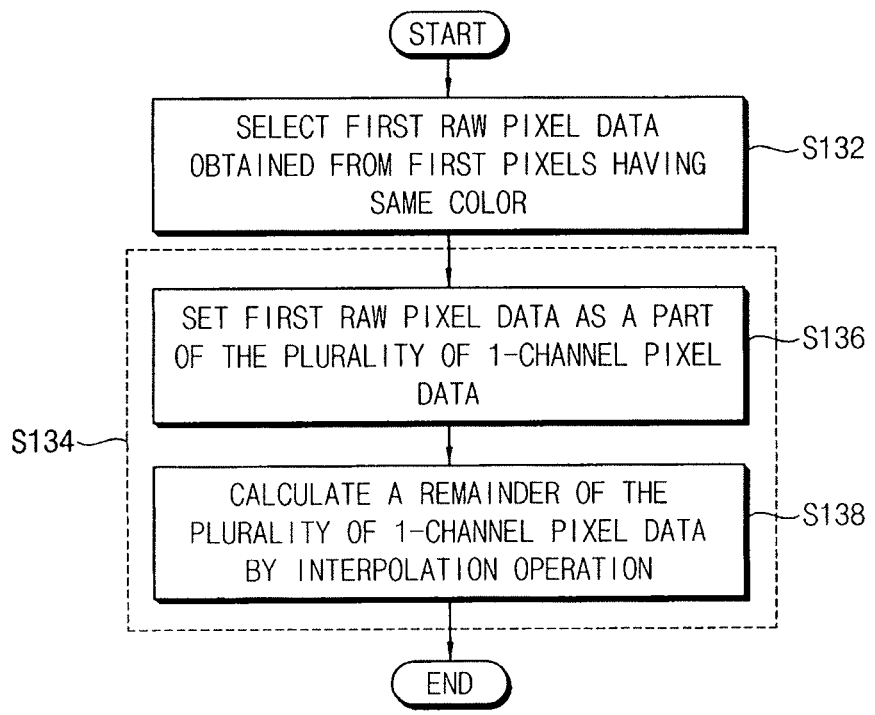
FIG. 12 illustrates an example of generating a plurality of 1-channel pixel data in FIG. 11.

FIG. 11 illustrates another example of converting an input image into an 1-channel image in FIG. 6. FIG. 12 illustrates an example of generating a plurality of 1-channel pixel data in FIG. 11. Referring to FIGS. 6, 10A, 10B, 11 and 12, when an input image is converted into an 1-channel image (step S100), a raw image RIMG that has not been processed may be received as the input image (step S110). Step S110 in FIG. 11 may be substantially the same as step S110 in FIG. 8.

Referring to FIGS. 10A and 10B, a plurality of 1-channel pixel data P11, P12, P13, P14, P15, P16, . . . , P21, P22, P23, P24, P25, P26, . . . , P31, P32, P33, P34, P35, P36, . . . , P41, P42, P43, P44, P45, P46, . . . included in an 1-channel image GIMG may be generated based on a part of a plurality of raw pixel data R11, G12, R13, G14, R15, G16, . . . , G21, B22, G23, B24, G25, B26, . . . , R31, G32, R33, G34, R35, G36, . . . , G41, B42, G43, B44, G45, B46, . . . included in the raw image RIMG (step S130 in FIG. 11).

When the plurality of 1-channel pixel data are generated (step S130 in FIG. 11), first raw pixel data among the plurality of raw pixel data may be selected (step S132). For example, the first raw pixel data may be obtained from first pixels that correspond to the same color. The plurality of 1-channel pixel data may be obtained by upscaling the first raw pixel data (step S134 in FIG. 12). For example, the first raw pixel data may be set as a part of the plurality of 1-channel pixel data (step S136 in FIG. 12), and the remainder of the plurality of 1-channel pixel data may be calculated by an interpolation operation performed based on the first raw pixel data (step S138 in FIG. 12).

In some example embodiments, referring to FIGS. 10A and 10B, the red pixel data R11, R13, R15, ..., R31, R33, R35, ... in the raw image RIMG may be selected as the first raw pixel data, and values of the 1-channel pixel data P11, P13, P15, ..., P31, P33, P35, ... at corresponding positions in the 1-channel image GIMG may be set to be equal to values of the red pixel data R11, R13, R15, ..., R31, R33, R35, ..., respectively.

The remaining 1-channel pixel data P12, P14, P16, ..., P21, P22, P23, P24, P25, P26, ..., P32, P34, P36, ..., P41, P42, P43, P44, P45, P46, ... in the 1-channel image GIMG may be calculated by the interpolation operation. For example, the 1-channel pixel data P12 may be obtained by P12=(P11+P13)/2=(R11+R13)/2.

Similarly, the 1-channel pixel data P21 in the 1-channel image GIMG may be calculated using the 1-channel pixel data P11 and P31, the 1-channel pixel data P22 in the 1-channel image GIMG may be calculated using the 1-channel pixel data P11 and P33, and the remainder of 1-channel pixel data in the 1-channel image GIMG may be calculated in a similar way.

In other example embodiments, referring to FIGS. 10A and 10B, the blue pixel data B22, B24, B26, B42, B44, B46, ... in the raw image RIMG may be selected as the first raw pixel data, and the plurality of 1-channel pixel data in the 1-channel image GIMG may be obtained based on the blue pixel data B22, B24, B26 ... B42, B44. B46 ... in the raw image RIMG.

Figure 13:
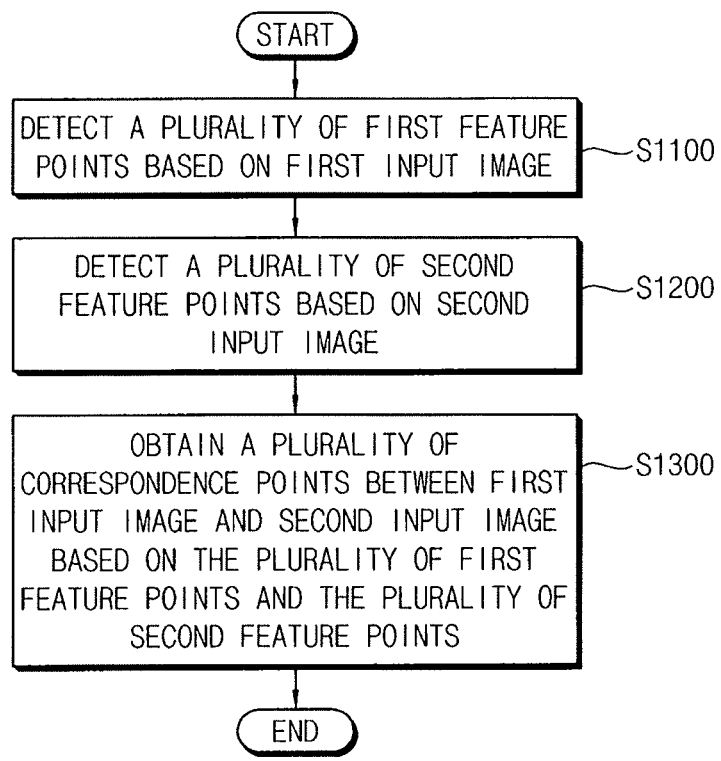
FIG. 13 illustrates a method of matching images according to example embodiments.

FIG. 13 illustrates a method of matching images according to example embodiments. Referring to FIG. 13, a plurality of first feature points are detected based on a first input image (step S1100), and a plurality of second feature points are detected based on a second input image (step S1200). The first input image and the second input image may be different images. For example, the first input image and the second input image may be two consecutive frame images in a moving image, i.e., may be a (t−1)-th frame image and a t-th frame image, respectively.

Each of steps S1100 and S1200 in FIG. 13 may be performed or executed based on a method of extracting features from an image according to example embodiments, as described with reference to FIGS. 1 through 12. For example, a plurality of first initial key points may be estimated based on a first input image. A plurality of first descriptors may be generated based on a first downscaled image that is generated by downscaling the first input image. The plurality of first feature points may be obtained by matching the plurality of first initial key points with the plurality of first descriptors, respectively. Similarly, a plurality of second initial key points may be estimated based on a second input image. A plurality of second descriptors may be generated based on a second downscaled image that is generated by downscaling the second input image. The plurality of second feature points may be obtained by matching the plurality of second initial key points with the plurality of second descriptors, respectively.

A plurality of correspondence points between the first input image and the second input image are obtained based on the plurality of first feature points and the plurality of second feature points (step S1300). For example, one correspondence point may be obtained by matching one first initial key point in the first input image with one second initial key point in the second input image. This matching operation may be performed using an original image (e.g., an original scale image).

As described above, when steps S1100 and S1200 are performed based on a method of extracting features of an image according to example embodiments, a descriptor which is robust against noise and has improved singularity may be obtained. In addition, when the plurality of correspondence points are obtained using the plurality of first and second descriptors having improved singularity, the accuracy of corresponding point estimation between the first and second input images (e.g., the accuracy of matching for the first and second input images) may be improved.

Figure 14:
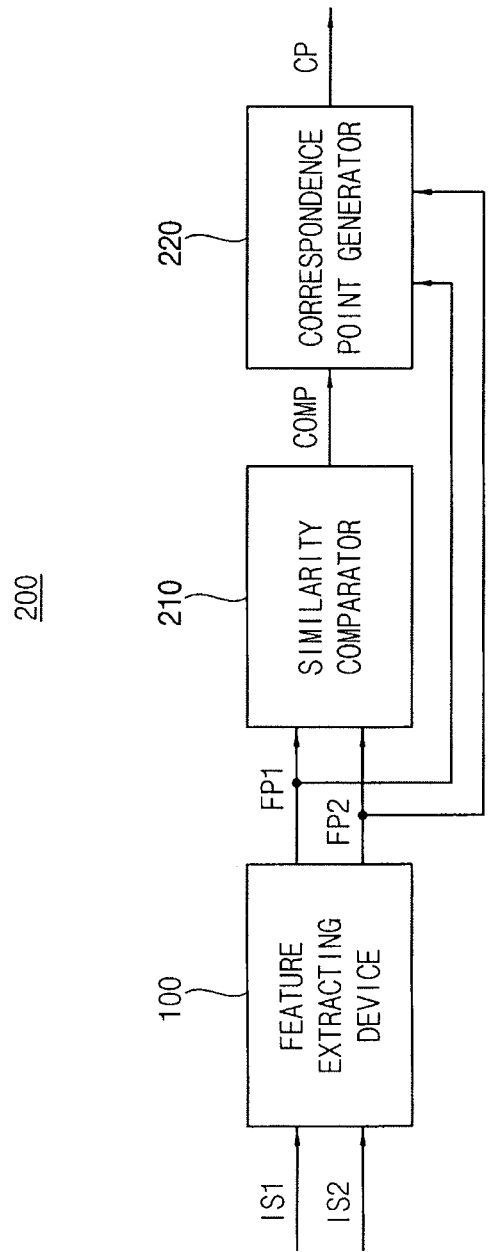
FIG. 14 illustrates an image matching device according to example embodiments.

FIG. 14 illustrates an image matching device according to example embodiments. Referring to FIG. 14, an image matching device 200 may include a feature extracting device 100, a similarity comparator 210 and a correspondence point generator 220.

The feature extracting device 100 may receive a first image signal IS1 indicating a first input image and a second image signal IS2 indicating a second input image, may detect a plurality of first feature points and a plurality of second feature points based on the first input image and the second input image, and may output a first feature point signal FP1 indicating the plurality of first feature points and a second feature point signal FP2 indicating the plurality of second feature points.

The feature extracting device 100 in FIG. 14 may correspond to the feature extracting device 100a in FIG. 2 or the feature extracting device 100b in FIG. 7. For example, when each of the first and second input images is an 1-channel image, the feature extracting device 100 in FIG. 14 may be the feature extracting device 100a in FIG. 2. When each of the first and second input images is a raw image, the feature extracting device 100 in FIG. 14 may correspond to the feature extracting device 100b in FIG. 7.

The similarity comparator 210 may receive the first feature point signal FP1 and the second feature point signal FP2, may compare similarities between the plurality of first descriptors included in the plurality of first feature points with the plurality of second descriptors included in the plurality of second feature points, and may output a comparison signal COMP indicating comparison results.

The correspondence point generator 220 may receive the first feature point signal FP1, the second feature point signal FP2 and the comparison signal COMP, may obtain a plurality of correspondence points between the first input image and the second input image, and may output a correspondence point signal CP indicating the plurality of correspondence points.

In some example embodiments, at least a part of the similarity comparator 210 and the correspondence point generator 220 may be implemented in hardware. In other example embodiments, at least a part of the similarity comparator 210 and the correspondence point generator 220 may be implemented in software, e.g., instruction codes or program routines.

Figure 15:
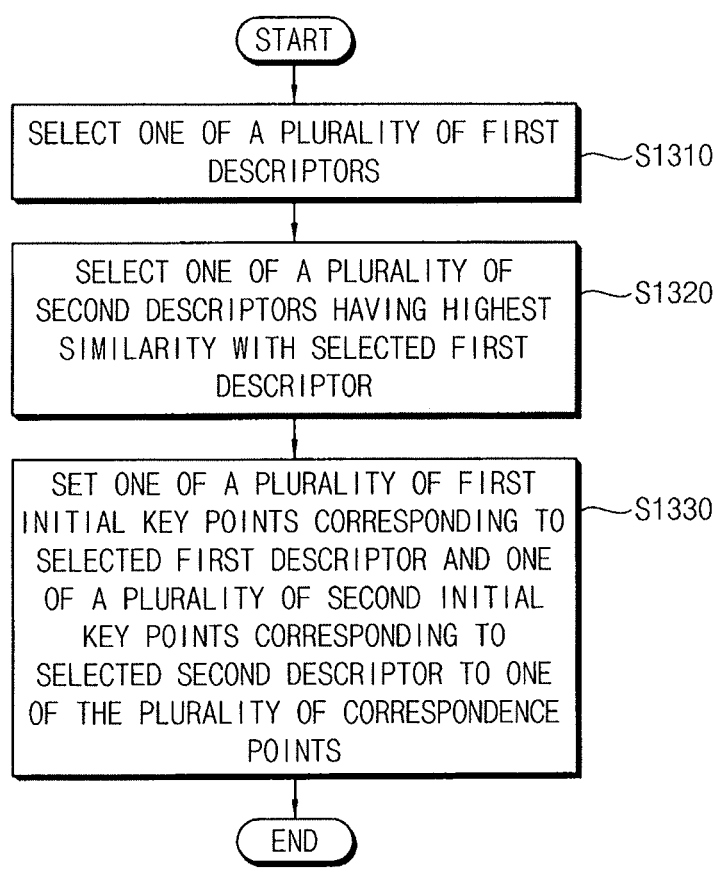
FIG. 15 illustrates an example of obtaining a plurality of correspondence points in FIG. 13.
Figure 16:
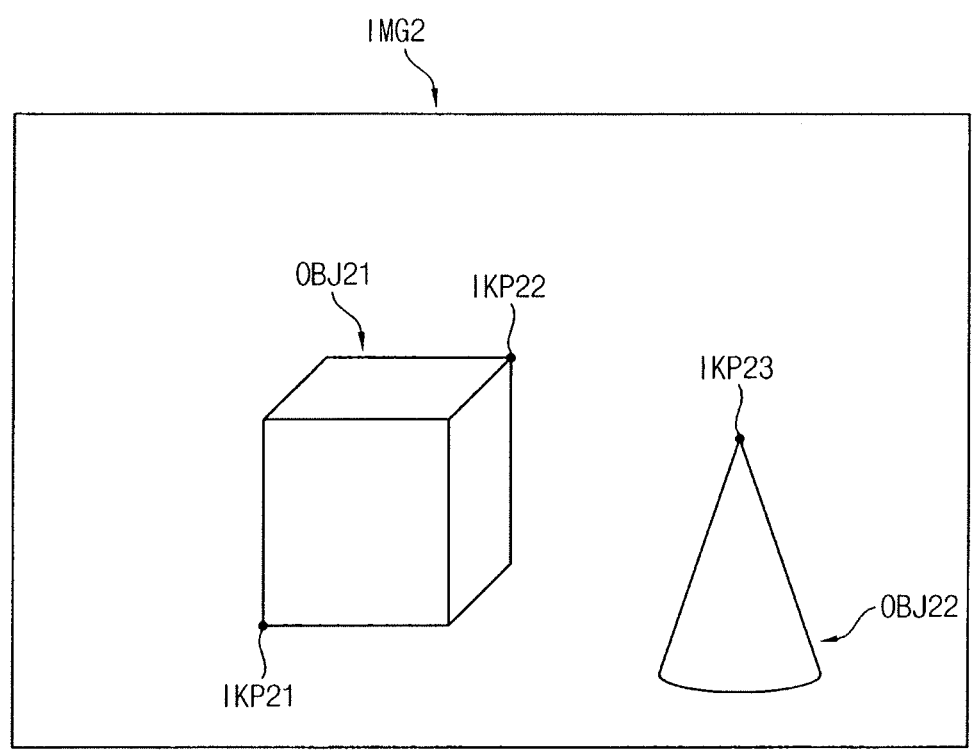
FIG. 16 illustrates an operation of obtaining the plurality of correspondence points in FIG. 15.

FIG. 15 illustrates an example of obtaining a plurality of correspondence points in FIG. 13. FIG. 16 illustrates an example for describing an operation of obtaining the plurality of correspondence points in FIG. 15.

Referring to FIGS. 4A, 13, 15 and 16, before the plurality of correspondence points are obtained, a plurality of first feature points $f_j^{t-1} = \{x_j^{t-1}, \hat{D}_j^{t-1}\}$, j=1, 2, 3, ..., n are obtained by matching the plurality of first initial key points IKP11, IKP12 and IKP13 in the first input image IMG1 (e.g., a (t−1)-th frame image) with the plurality of first descriptors, as illustrated in FIG. 4A. In addition, a plurality of second feature points $\hat{f}_i^t \{x_i^t, \hat{D}_i^t\}$, i=1, 2, 3, ... n are obtained by matching a plurality of second initial key points IKP21, IKP22 and IKP23 in a second input image IMG2 (e.g., a t-th frame image) with a plurality of second descriptors, as illustrated in FIG. 16. Objects OBJ21 and OBJ22 in the second input image IMG2 may be shifted to a lower right direction, compared to the first input image IMG1.

When the plurality of correspondence points are obtained (step S1300), one of the plurality of first descriptors in the plurality of first feature points may be selected (step S1310), and one of the plurality of second descriptors in the plurality of second feature points may be selected by comparing a similarity between a selected first descriptor and the plurality of second descriptors (step S1320). A selected second descriptor may have the highest similarity with the selected first descriptor. Steps S1310 and S1320 may be performed by the similarity comparator 210 in FIG. 14.

One of the plurality of first initial key points corresponding to the selected first descriptor in the plurality of first feature points and one of the plurality of second initial key points corresponding to the selected second descriptor in the plurality of second feature points may be set to one of the plurality of correspondence points (step S1330). Step S1330 may be performed by the correspondence point generator 220 in FIG. 14.

For example, the first descriptor corresponding to the first initial key point IKP11 may be selected, a similarity between the selected first descriptor and all of the second descriptors corresponding to the second initial key points IKP21, IKP22 and IKP23 may be compared, and one second initial key point corresponding to the second descriptor having the highest degree of similarity with the selected first descriptor may be selected. For example, the first initial key point IKP11 and the second initial key point IKP21 may be set to one correspondence point.

Similarly, the similarity comparison may be performed for the remaining first descriptors, the first initial key point IKP12 and the second initial key point IKP22 may be set to another one correspondence point, and the first initial key point IKP13 and the second initial key point IKP23 may be set to the other correspondence point. As such, all of the plurality of correspondence points may be obtained by comparing similarities $d_{i,j}(\hat{D}_i^{t-1}, \hat{D}_j^t)$ between descriptors of the plurality of first feature points $\hat{f}_j^{t-1}=\{x_j^{t-1}, \hat{D}_j^{t-1}\}$, j=1, 2, 3, . . . , n and the plurality of second feature points $\hat{f}_i^t=\{x_i^t, \hat{D}_i^t\}$, i=1, 2, 3, . . . , n.

In some example embodiments, the similarities between the plurality of first descriptors and the plurality of second descriptors may be determined based on at least one of a Hamming distance and an Euclidean distance. For example, the similarities between the plurality of first descriptors and the plurality of second descriptors may be determined based on at least one of various other algorithms.

Example embodiments may be described with reference to FIG. 15 based on a case where one correspondence point is set with respect to the first descriptor, e.g., by comparing the similarity between one first descriptor and all of the second descriptors. For example, one second descriptor may be selected first, a similarity between the selected second descriptor and all of the first descriptors may be compared to select one first descriptor having the highest degree of similarity with the selected second descriptor, and one first initial key point and one second initial key points corresponding to the selected first and second descriptors may be set to one correspondence point.

Figure 17:
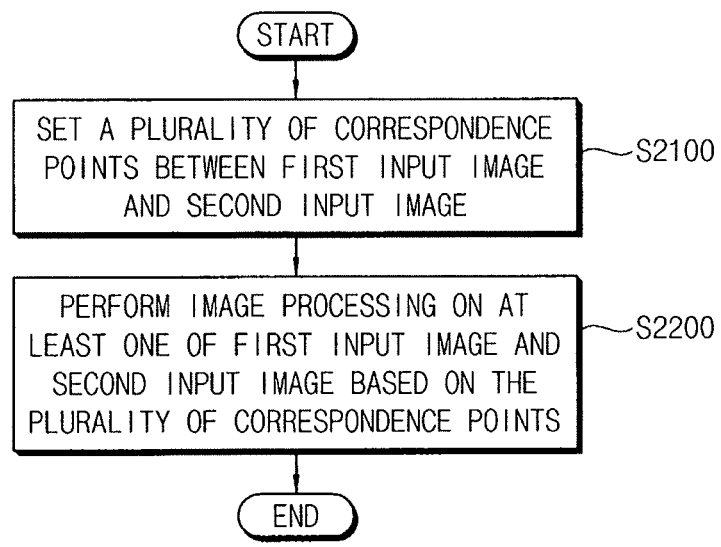
FIG. 17 illustrates a method of processing images according to example embodiments.

FIG. 17 illustrates a method of processing images according to example embodiments. Referring to FIG. 17, a plurality of correspondence points between a first input image and a second input image may be set (step S2100).

Step S2100 in FIG. 17 may be performed or executed based on a method of matching images according to example embodiments, as described with reference to FIGS. 13 through 16. For example, a plurality of first feature points may be detected based on a first input image. A plurality of second feature points may be detected based on a second input image. The plurality of correspondence points between the first input image and the second input image may be obtained based on the plurality of first feature points and the plurality of second feature point.

An image processing may be performed on at least one of the first input image and the second input image based on the plurality of correspondence points (step S2200). For example, the image processing may include various functions, e.g., camera motion, noise reduction, Video Digital Image Stabilization (VDIS), High Dynamic Range (HDR), or the like. In addition, the image processing may further include various functions, e.g., motion detection, image registration, video tracking, image mosaicing, panoramic stitching, 3D modeling, object recognition, or the like.

Figure 18:
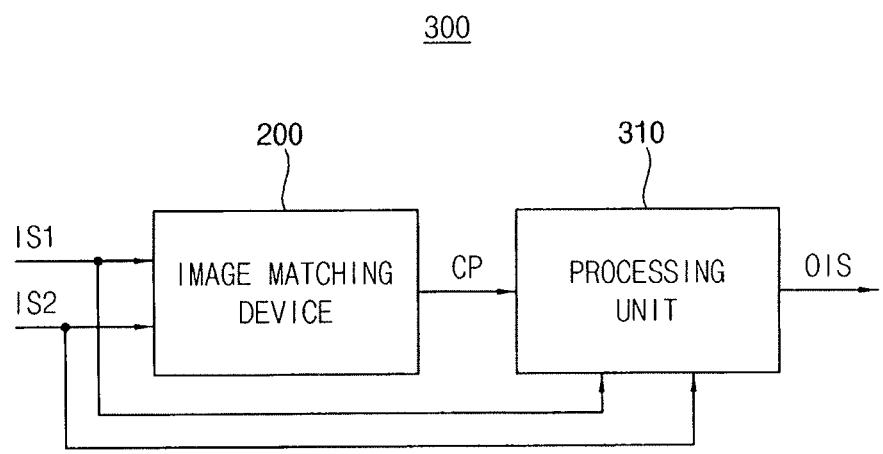
FIG. 18 illustrates an image processing device according to example embodiments.

FIG. 18 illustrates an image processing device according to example embodiments. Referring to FIG. 18, an image processing device 300 may include an image matching device 200 and a processing unit 310.

The image matching device 200 may receive a first image signal IS1 indicating a first input image and a second image signal IS2 indicating a second input image, may set a plurality of correspondence points between the first input image and the second input image, and may output a correspondence point signal CP indicating the plurality of correspondence points. The image matching device 200 in FIG. 18 may correspond to the image matching device 200 in FIG. 14.

The processing unit 310 may receive the first image signal IS1, the second image signal IS2 and the correspondence point signal CP, may perform an image processing on at least one of the first input image and the second input image, and may output an output image signal OIS indicating a result of the image processing.

In some example embodiments, at least a part of the processing unit 310 may be implemented in hardware. In other example embodiments, at least a part of the processing unit 310 may be implemented in software, e.g., instruction codes or program routines.

As will be appreciated by those skilled in the art, the present disclosure may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device. For example, the computer readable medium may be a non-transitory computer readable medium.

FIG. 19 illustrates an electronic system according to example embodiments. Referring to FIG. 19, an electronic system 1000 may include a processor 1010, a connectivity 1020, a memory device 1030, a user interface 1040, an image pickup device 1050, and an image processing device 1060. Further, the electronic system 1000 may include a power supply.

The processor 1010 may perform various computational functions, e.g., particular calculations and tasks. The connectivity 1020 may communicate with an external device. The memory device 1030 may operate as a data storage for data processed by the processor 1010 or a working memory. The user interface 1040 may include at least one input device, e.g., a keypad, a button, a microphone, a touch screen, etc., and/or at least one output device, e.g., a speaker, or a display device, etc. The power supply may provide power to the electronic system 1000.

The image pickup device 1050 and the image processing device 1060 may be controlled by the processor 1010. The image pickup device 1050 may provide an input image to the image processing device 1060. For example, the image pickup device 1050 may include a complementary metal oxide semiconductor (CMOS) image sensor, a charged coupled device (CCD) image sensor, etc. The image processing device 1060 may be the image processing device 300 in FIG. 18 and may operate according to example embodiments described with reference to FIGS. 1 through 18.

By way of summation and review, when key point estimation for image matching and descriptor generation are performed in the same image scale, noise may be issued.

In the method of extracting the features from the image, the method of matching the images and the method of processing the images according to example embodiments, the plurality of key points may be estimated based on the input image, and the plurality of descriptors may be generated based on the down-scaled image. The positional accuracy of the key points may be maintained by estimating the key points using the original image, and the descriptor which is robust against noise and has improved singularity may be obtained by generating the descriptors using the downscaled image in which the intensity difference between the adjacent pixels is relatively large. In addition, when the plurality of correspondence points are obtained using the plurality of descriptors having improved singularity, the accuracy of corresponding point estimation between two input images (e.g., the accuracy of matching for two input images) may be improved.

Particularly, a low illuminance image captured in a relatively dark environment, e.g., a night-time photograph, and/or a blur image, in which motion of an object is large, may be provided as the input image. In this case, when descriptors are obtained based on a downscaled image of the low illuminance image or the blur image instead of an original image of them, the descriptors obtained in a downscaled image may have more improved specificity or singularity than descriptors obtained in the original image.

The exemplary embodiments may be applied to various electronic devices and electronic systems including the image processing device. For example, the exemplary embodiments may be applied to systems, e.g., a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc. In addition, the exemplary embodiments may be applied to various devices and systems requiring image processing, e.g., an automotive camera, a medical camera, etc.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of extracting features from an image, the method comprising:
   estimating a plurality of initial key points based on a 1-channel image;
   downscaling the 1-channel image by a scaling factor to generate a downscaled 1-channel image;
   calculating a plurality of downscaled key points from the plurality of initial key points using the scaling factor;
   generating a plurality of descriptors for the downscaled 1-channel image based on the plurality of downscaled key points; and
   obtaining a plurality of feature points by matching the plurality of initial key points with the plurality of descriptors, respectively, wherein:
   the 1-channel image is generated from a raw image having X color channels arranged in groups of 4 pixels corresponding to two or more colors as a 2*2 matrix, where X is a natural number greater than or equal to two, by adding values of the 4 pixels of the 2*2 matrix together and then dividing by four to generate the 1-channel image, and the plurality of initial key points are estimated based on the generated 1-channel image.

2. The method as claimed in claim 1, wherein generating the plurality of descriptors includes:
   calculating the plurality of descriptors for the downscaled 1-channel image based on a plurality of neighboring points that are adjacent to the plurality of downscaled key points in the downscaled 1-channel image.

3. The method as claimed in claim 2, wherein an intensity difference between adjacent pixels increases when the 1-channel image is converted into the downscaled 1-channel image.

4. The method as claimed in claim 1, wherein the plurality of initial key points are estimated using at least one of a corner detection and a blob detection.

5. The method as claimed in claim 1, wherein the plurality of descriptors are generated using at least one of ORB (Oriented Features from Accelerated Segment Test (FAST) and Rotated Binary Robust Independent Elementary Features (BRIEF)), SIFT (Scale-Invariant Feature Transform), SURF (Speeded Up Robust Features) and MSD (Maximal Self-Dissimilarities).

6. A method of matching images, the method comprising:
   detecting a plurality of first feature points based on a first input image;
   detecting a plurality of second feature points based on a second input image; and
   obtaining a plurality of correspondence points between the first input image and the second input image based on the plurality of first feature points and the plurality of second feature points, wherein
   detecting the plurality of first feature points includes extracting features from the first input image according to the method of claim 1.

7. The method as claimed in claim 6, wherein detecting the plurality of second feature points includes:
 estimating a plurality of second initial key points based on the second input image;
 generating a plurality of second descriptors based on a second downscaled image that is generated by downscaling the second input image; and
 obtaining the plurality of second feature points by matching the plurality of second initial key points with the plurality of second descriptors, respectively.

8. The method as claimed in claim 7, wherein obtaining the plurality of correspondence points includes:
 selecting one of a plurality of first descriptors in a plurality of first feature points from the first input image;
 selecting one of the plurality of second descriptors in the plurality of second feature points by comparing a similarity between a selected first descriptor and the plurality of second descriptors, a selected second descriptor having a highest similarity with the selected first descriptor; and
 setting one of a plurality of first initial key points corresponding to the selected first descriptor in the plurality of first feature points and one of the plurality of second initial key points corresponding to the selected second descriptor in the plurality of second feature points to one of the plurality of correspondence points.

9. The method as claimed in claim 8, wherein a similarity between the selected first descriptor and the selected second descriptor is determined based on at least one of a Hamming distance and a Euclidean distance.

10. A method of processing images, the method comprising:
 setting a plurality of correspondence points between a first input image and a second input image; and
 performing an image processing on at least one of the first input image and the second input image based on the plurality of correspondence points,
 wherein, setting the plurality of correspondence points includes:
  detecting a plurality of first feature points based on the first input image;
  detecting a plurality of second feature points based on the second input image; and
  obtaining the plurality of correspondence points based on the plurality of first feature points and the plurality of second feature points,
 wherein detecting the plurality of first feature points includes extracting features from the first input image according to the method of claim 1.

* * * * *